United States Patent
Murphy et al.

(10) Patent No.: US 6,790,308 B2
(45) Date of Patent: Sep. 14, 2004

(54) METHOD AND APPARATUS FOR MAKING CLUTCH PLATE WITH MULTI SEGMENT FRICTION MATERIAL

(75) Inventors: Kevin P. Murphy, Oak Park, IL (US); Dean A. Collis, Wheaton, IL (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 10/336,246

(22) Filed: Jan. 3, 2003

(65) Prior Publication Data

US 2004/0129380 A1 Jul. 8, 2004

(51) Int. Cl.$^7$ .......................... B32B 31/00; F16D 13/00
(52) U.S. Cl. ...................... 156/265; 156/270; 156/299; 156/300; 156/512; 156/521; 156/516; 156/517; 156/558; 156/560; 29/417; 188/184; 188/218 R; 83/27
(58) Field of Search .................................. 156/265, 270, 156/299, 300, 512, 521, 516, 517, 558, 560; 29/417; 188/184, 218 XL; 83/27

(56) References Cited

U.S. PATENT DOCUMENTS

| | | | |
|---|---|---|---|
| 3,871,934 A | 3/1975 | Marin | 156/94 |
| 4,002,225 A | 1/1977 | Marin | 188/73.2 |
| 4,260,047 A | 4/1981 | Nels | 192/70.14 |
| 4,674,616 A | 6/1987 | Mannino, Jr. | 192/107 R |
| 5,094,331 A | 3/1992 | Fujimoto et al. | 192/70.12 |
| 5,335,765 A | 8/1994 | Takakura et al. | 192/107 R |
| 5,460,255 A | 10/1995 | Quigley | 192/113.36 |
| 5,571,372 A | 11/1996 | Miyaishi et al. | 156/515 |
| 5,615,758 A | 4/1997 | Nels | 192/113.36 |
| 5,776,288 A | 7/1998 | Stefanutti et al. | 156/263 |
| 5,897,737 A | 4/1999 | Quigley | 156/265 |
| 5,998,311 A | 12/1999 | Nels | 442/203 |
| 6,014,205 A | 1/2000 | Kanazawa et al. | 356/73 |
| 6,019,205 A | 2/2000 | Wilworth et al. | 192/107 R |
| 6,572,726 B2 * | 6/2003 | Shimoi et al. | 156/265 |
| 6,596,119 B2 * | 7/2003 | Honda et al. | 156/265 |

* cited by examiner

*Primary Examiner*—Linda Gray
(74) *Attorney, Agent, or Firm*—Emch, Schaffer, Schaub & Porcello Co., L.P.A.; Greg Dziegielewski

(57) ABSTRACT

A method and apparatus for making a friction clutch plate includes cutting a supply of friction material into a plurality of individual shaped segments. The cut segments are moved in a first horizontal linear direction to a position adjacent a shuttle assembly. At least a first cut segment is engaged by the shuttle assembly which transfers the first cut segment in a second horizontal linear direction which is substantially perpendicular to the first horizontal linear direction. The first cut segment is deposited in a first indexing fixture. The remaining cut segments are sequentially moved in the first horizontal linear direction to the position adjacent the shuttle assembly. At least a second cut segment is engaged by the shuttle assembly and is transferred in a third horizontal linear direction which substantially perpendicular to the first horizontal linear direction. In certain embodiments the method and apparatus further includes moving the cut segment in a vertical direction prior to moving the cut segment either in the second horizontal linear direction or the third horizontal linear direction.

9 Claims, 11 Drawing Sheets

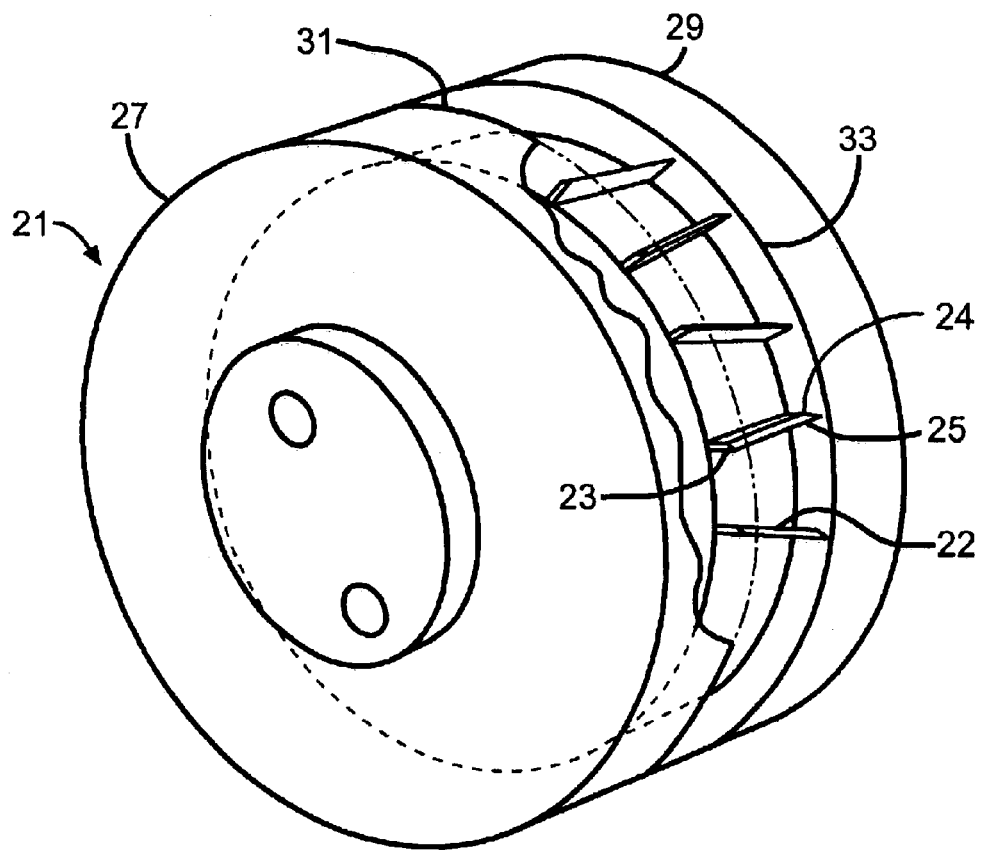
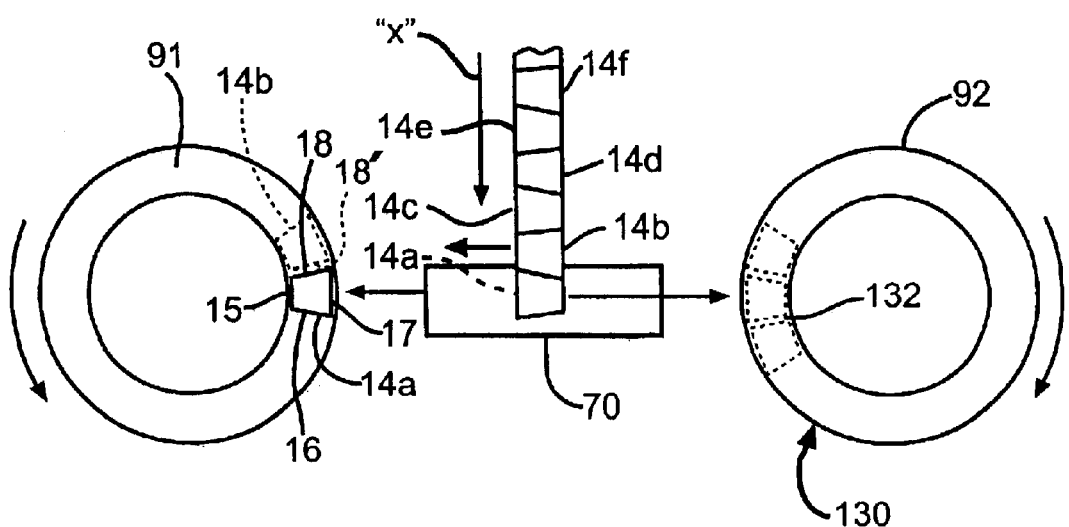

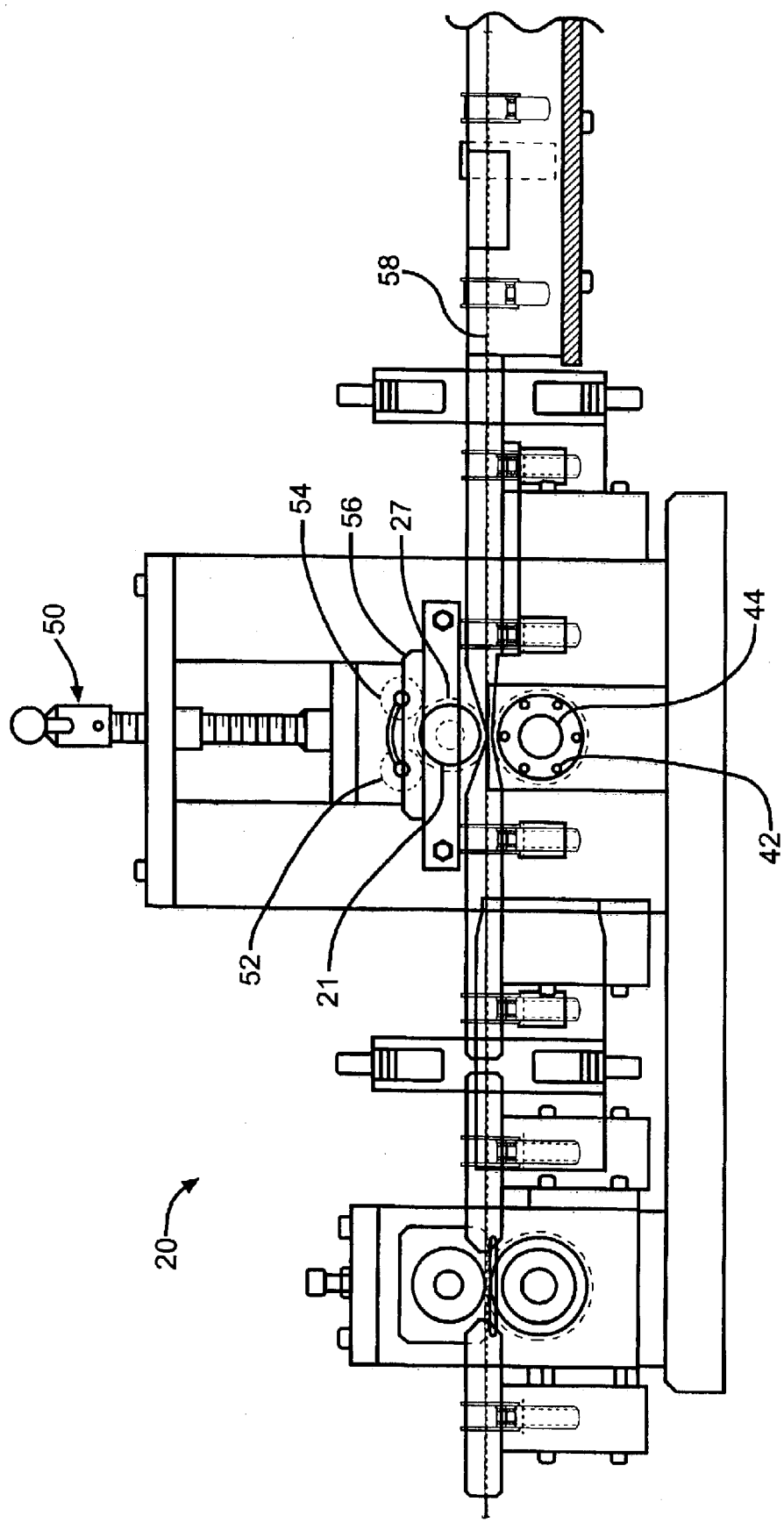

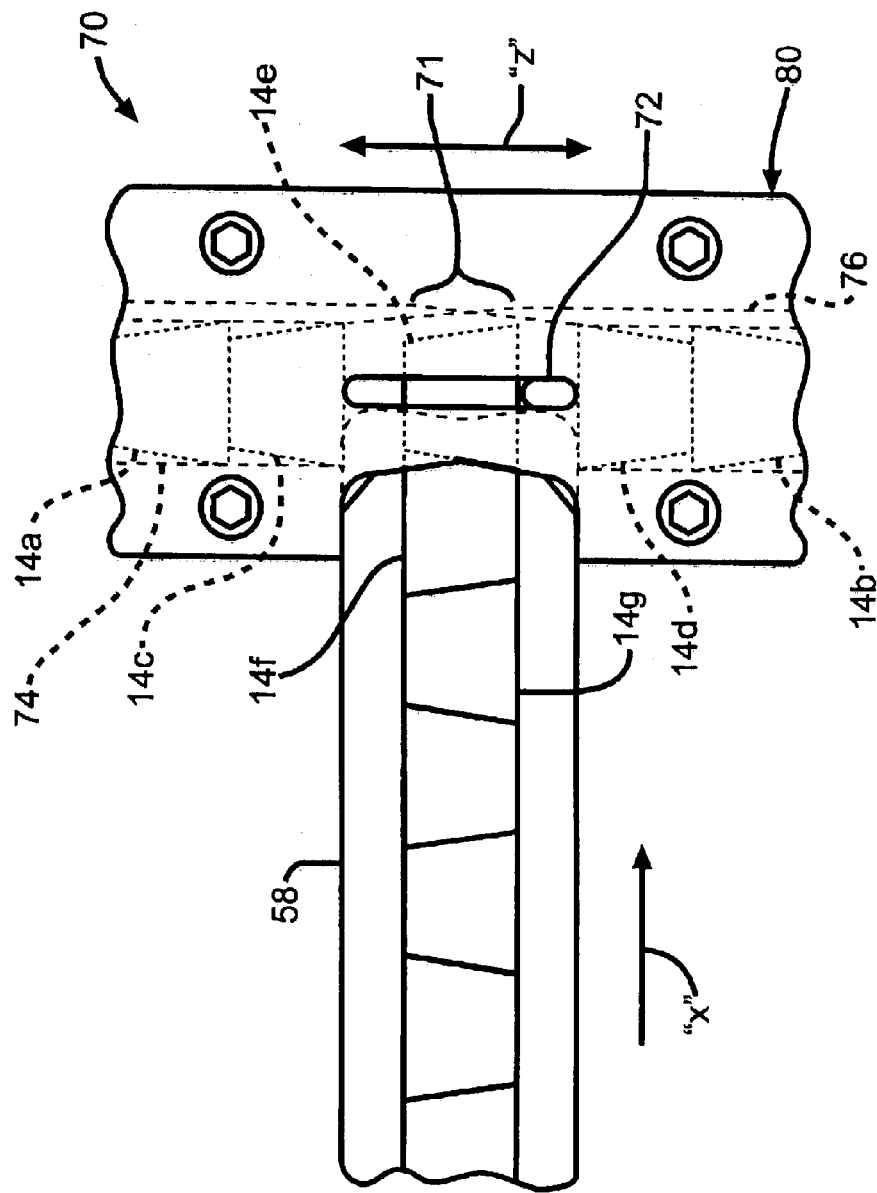

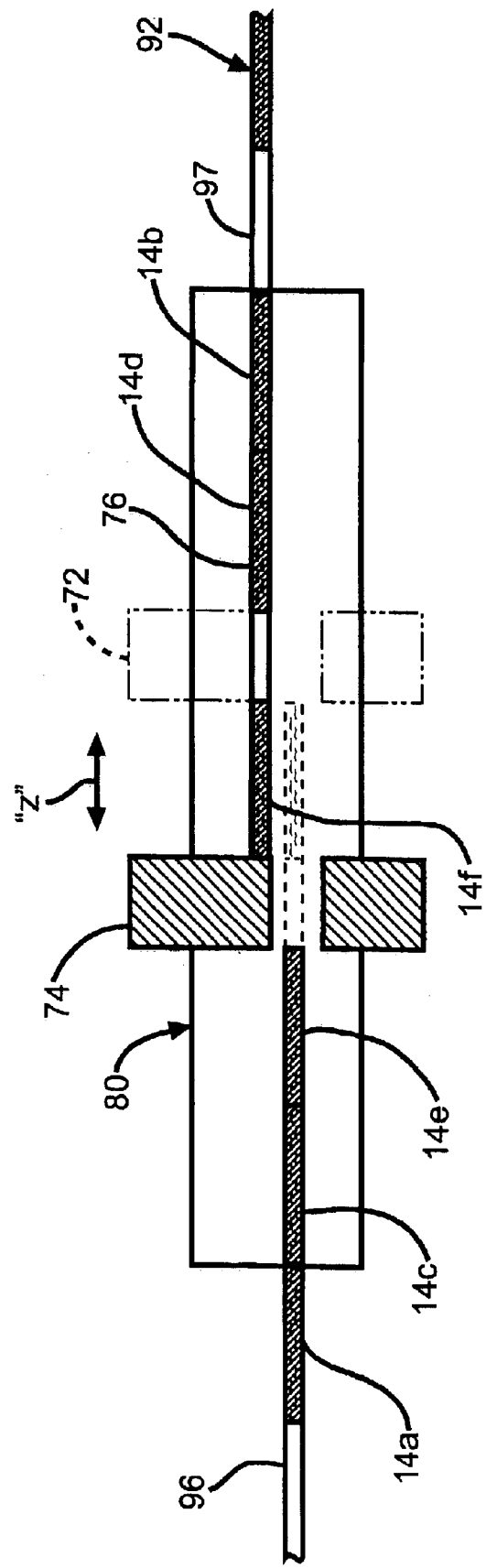

METHOD AND APPARATUS FOR MAKING CLUTCH PLATE WITH MULTI SEGMENT FRICTION MATERIAL

TECHNICAL FIELD

The present invention relates generally to a method and apparatus for making a core plate having a friction material facing. More specifically, the invention is directed to a method and apparatus for making a friction plate having multiple segments of friction material on a core plate.

BACKGROUND OF THE PRESENT INVENTION

The present invention relates to a method and apparatus for making friction materials for use with a wet-type multi-plate clutch. The multi-plate clutches generally comprise a plurality of interleaved clutch discs and clutch plates which engage to provide the transmission of energy from a drive engine to a drive wheel. Wet-type clutches also utilize a lubricant such as oil to reduce clutch wear, cool the friction facings of the clutch discs, and provide desired hydrostatic forces between the clutch plates and clutch discs.

The friction material is usually composed of sintered metal or paper which normally is impregnated with a phenolic based resin. The friction material is commonly cut from sheets of the friction material. The sheet of material is fed through a die cutting apparatus which punches out the desired shape of the friction material from the sheet. The desired shaped friction material is then separated from the remaining, or scrap, material.

The friction material is relatively expensive and, therefore, it is desirable to optimize amount of friction material used and to eliminate waste from the manufacturing process.

Further, the elimination of any scrap or waste product from the manufacturing process assists in meeting various industry compliance standards. Also, the proper disposal of any scrap is the focus of increasing environmental regulation. Any scrap resulting from the manufacturing process must be disposed of in an appropriate manner. This is a concern since the manufacturing of friction materials generally uses expensive materials. Thus, the disposal of scrap friction material is becoming increasingly costly.

Another, and sometimes competing, concern is that the friction material must continue to meet the increasing demands required by the newly developing engines, clutches, transmissions, and the like. It is therefore important that sufficient cooling and lubrication of the friction material and clutch plates occurs such that smooth engagement and disengagement of the clutch is maintained, without creating excessive wear on the members of the clutch and friction facing material. The designs of many prior art friction material incorporate the use of grooves or slot patterns within the facing material to achieve the desired cooling and lubrication by allowing the passage of a fluid such as oil through the friction facings. Such cooling grooves are generally produced from one of three labor intensive methods.

One method provides that the friction material is pre-grooved prior to being cut and applied to the clutch plate is shown by Nels U.S. Pat. No. 4,260,047. Another method of producing grooves uses a configured tooling to compress portions of the friction material during the hot pressure bonding process. Yet another method involves producing cut grooves in a finished friction plate by mounting the friction plate onto a fixture and passing multiple milling and grinding wheels through the friction material to cut distinct grooves of desired depth and definition.

In addition, numerous clutch designs for producing a large variety of friction facing materials and designs of friction facing materials are known. Several common friction facings, currently available, are shown by the disclosures of Nels U.S. Pat. No. 4,260,047 and Mannino, Jr. U.S. Pat. No. 4,674,616. These friction discs, which are for use with clutches, are formed from friction material and produced from the joining of a plurality of separate arcuate segments. The arcuate segments are pre-grooved to allow cooling oil to flow over the friction facing during clutch operation.

The Fujimoto et al. U.S. Pat. No. 5,094,331, Quigley U.S. Pat. No. 5,460,255, Stefanutti et al. U.S. Pat. No. 5,776,288, Quigley U.S. Pat. No. 5,897,737 and Willworth et al. U.S. Pat. No. 6,019,205 disclose clutch friction plates having a large number of friction material segments on the plate. The segments are in a spaced apart relationship such that an oil groove is provided between every adjacent segment.

The Marin U.S. Pat. Nos. 3,871,934 and 4,002,225 show a friction material wound around the outer periphery disc, such that the friction material overlaps the disc on both sides. The overlap is then cut at intervals around the periphery and folded onto the surface of the disc.

The Takakura et al. U.S. Pat. No. 5,335,765, discloses a friction member having sets of first grooves and second grooves disposed in a radial plane and inclined obliquely backwardly in relation to the direction of rotation.

The Nels U.S. Pat. Nos. 5,615,758 and 5,998,311 show friction yarn facing materials with no grooves, but rather, the warp and fill yarns form channels to allow for the flow of fluid therethrough.

The common failing of the previous designs of the apparatuses for making segmented friction materials lies in the formation of the intricate shapes and designs of the segments of friction material themselves, which, consequently, leads to manufacturing complexities, increased scrap production, and the resultant concerns regarding proper disposal of the scrap. Further, these intricately shaped friction materials are all individually manufactured to meet specific requirements for specific types of friction clutches and, generally speaking, cannot be used in a wide variety of applications.

For example, the Miyaishi et al. U.S. Pat. No. 5,571,372 shows one manufacturing method which produces about 20% scrap and describes a device which cuts and holds individual sections of friction material until a spring-like mechanism is engaged to dispense the individual portions on the core plate.

Therefore, there is a need for an apparatus to manufacture a friction clutch plate having distinct cooling groove patterns of desired depth and definition without the need for secondary operations and attendant machinery.

There is a further need for an apparatus for making a multiple segment friction material which is essentially scrapless in its manufacture.

There is still another need to provide a method and apparatus for making a friction material which apparatus has structural advantages designed to enhance production performance of the core plate with the friction material, and specifically increased durability, reduced drag and reduced hot spotting.

There is a still further need for a friction material which is universally applicable to differing types of clutches and friction plates.

BRIEF DESCRIPTION OF THE DRAWINGS

FIG. 3 is a schematic perspective illustration, partially in phantom and shown partially in cut-away, showing a cutting device.

FIG. 4 is a schematic illustration of individual keystone segments of friction material being positioned in an indexing fixture.

FIG. 5 is a side elevation view, partially in phantom, of a roll cutting apparatus.

FIG. 6 is a top plan schematic illustration, partially in phantom, of a shuttling fixture.

DISCLOSURE OF THE PRESENT INVENTION

Figure 1:
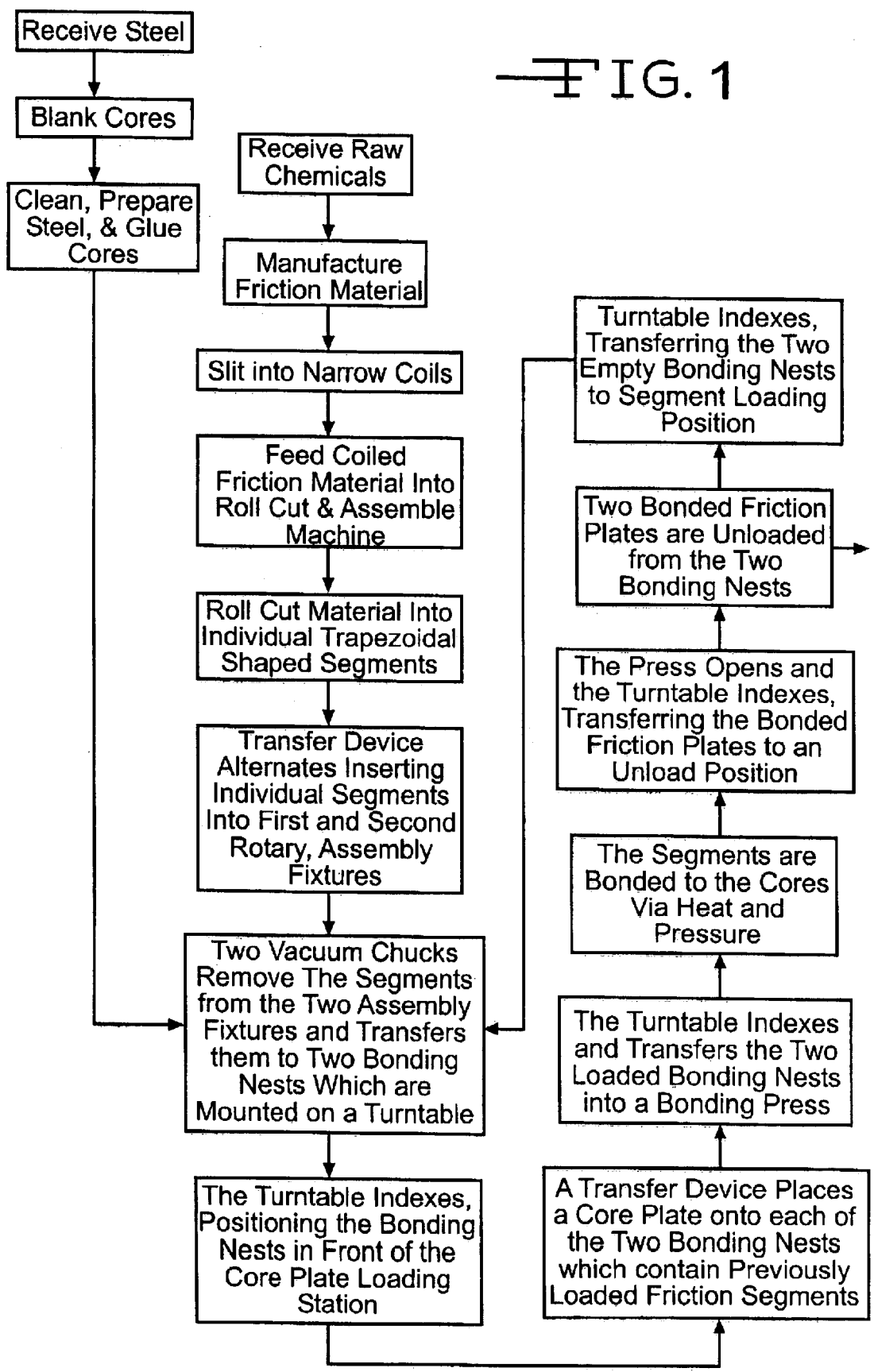
FIG. 1 is a schematic flow diagram showing a process for making a clutch plate with multiple individual segments of friction material.

As the performance requirements for automobiles become more stringent, the clutches must be able to provide high torque at high RPMs in order to operate efficiently at high temperatures. This performance requirement therefore demands more expensive, higher performance materials for use as the friction material in these clutches.

Thus, one aspect of the present invention provides an efficient method and apparatus to produce a friction clutch plate useful in such demanding environments. The friction clutch plate has a plurality of segments of keystone shaped friction material on one, or in some embodiments, both, annular sides of the clutch plate. The individual keystone, or trapezoidal, shaped segments minimize the friction surface area on the clutch plate while simultaneously maintaining the cooling and lubrication requirements needed for the clutch plate. The keystone segments of friction material allow for better heat dissipation within the clutch where such heat dissipation is needed to meet the performance standards for the higher RPM/smaller engines common to today's automobile.

The keystone shaped segments of friction material are oriented on the clutch plate so as to create desired lubrication and cooling functions via radially extending oil channels on the clutch plate. The orientation of the segments of the friction material achieves a desired direction of oil flow radially into or out of the clutch plate and also creates a desired amount of hydrostatic pressure on the clutch plate. The size, shape, spacing and orientation of the segments all operate to control the degree of fluid pumping, the hydrostatic pressure, and the amount of cooling of the friction clutch plate.

The individual segments are placed on an annular face of the core plate. The "keystone" shape of the individual segments allows for the efficient placement or covering of the friction material on the core plate and also produces desired grooves in the completed clutch plate.

The keystone segments of friction material provides a significant improvement in friction material utilization over conventional segmented, friction facings. Essentially 100% of the friction material is used to form the keystone shaped friction segments; that is, there is no unused or scrap material.

According to one aspect of the present invention, a suitable friction material is formed by "roll cutting" the friction material into a desired keystone geometry. The inventors have surprisingly found that the step of "roll cutting" the friction material, as opposed to punch cutting, reduces contamination of the adjacent environment. The roll cutting of the friction material offers many advantages over the currently used "punch" or "die cut" methods for cutting friction materials. In these currently used methods, a cutting edge is pushed through the friction material until the material fractures or tears. Thus, ragged edges on the friction material are formed by the die cutting and/or punching operations. These ragged edges are often torn off or dislodged either during the clutch plate assembly process or during the useful life of the clutch plate itself. When these ragged edges are dislodged during the handling of the plates during the assembly process, objectionable dust particles are formed and contaminate the ambient environment. When these ragged edges are dislodged during use of the clutch plate, particles of debris are formed and contaminate the surrounding fluids, thereby fouling the system and making the system harder to work efficiently. Also, this floating and moving debris of friction material causes objectionable friction wear on other parts of the system. In contrast, the present invention uses a roll cutting process which has a knife-like edge that parts the friction material and generates almost no dust or debris.

FIG. 1 shows a flow diagram for producing a clutch plate with multiple keystone-shaped segments of friction material. Referring first to the left side of the figure, a supply of steel is received and blanked as a core. The core is then cleaned and, in certain embodiments, an adhesive or glue is applied to one or both faces of the core; in various embodiments, when the adhesive is a thermosetting adhesive, a "B" stage thermosetting process is used to "preset" the adhesive material.

Referring now to the center side of the figure, a supply of raw materials is received and friction paper material is formed and, in certain embodiments, saturated with a suitable resin. The friction paper material is slit into narrow coils having a desired width. The coiled friction material is fed into a roll cutting and assembling apparatus.

The material is roll cut into individual keystone shaped segments of friction material using a die cutting apparatus, as will be described in detail below.

A transfer device inserts individual segments of the keystone shaped friction material into opposing first and second rotary assembly fixtures. Two opposing vacuum assemblies are mounted operatively adjacent the corresponding first and second rotary assembling fixtures and are used to remove the segments from the two assembly fixtures. The first and second vacuum assemblies transfer, or load, the assembled segments into opposing bonding nests which are mounted on an adjacent turntable.

The turntable indexes and positions the filled, or loaded, bonding nests adjacent a core plate loading station.

A core loading device places a core plate onto each of the bonding nests.

The turntable indexes and transfers the loaded bonding nests adjacent a bonding apparatus for bonding the core plate to the friction material. The segments are bonded to the core in a suitable manner such as using heat and pressure. Thereafter, the bonding assembly, such as a press, opens and the turntable indexes, transferring the bonded friction plates to an unload position. The two bonded friction plates are unloaded from the bonded nests.

The turntable indexes and transfers the now empty bonding nests to the keystone friction material segment loading position.

Figure 2:
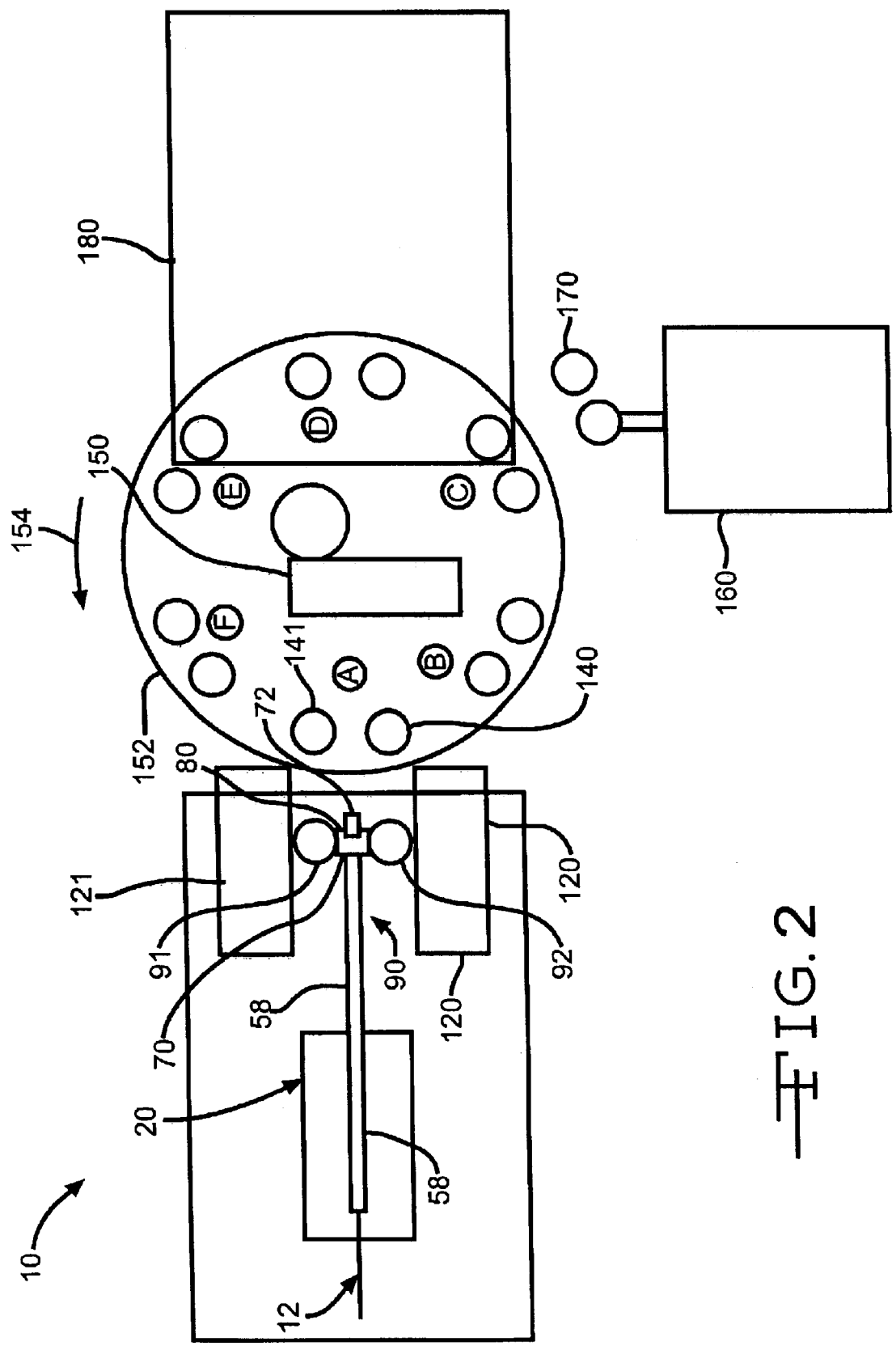
FIG. 2 is a top plan elevation schematic illustration of a multi-step assembly for producing a friction material.

Referring now to FIG. 2, a schematic illustration of a multi segment induction bonding multi step apparatus 10 is schematically shown. A supply of narrow strip of friction material 12 is operatively moved to a roll cutting apparatus 20 which cuts the strip of friction material into individual segments, as will be described in detail below.

The individual cut segments continue on a covered track 58 to a shuttle assembly 70 which separates and moves the individual segments of friction material into an assembly station 90, as will be described below. The assembly station 90 comprises a first assembly fixture 91 and a second assembly fixture 92. The shuttle assembly 70 moves alternating cut segments of friction material into the first and second assembly fixtures 91 and 92, respectively, as will be described in detail below.

The first and second assembly fixtures 91 and 92 are each adjacent first and second transfer assemblies 120 and 121, respectively. The assembly fixtures 120 and 121 each engage the cut friction segments. The assembled segments are then positioned in an adjacent bonding nest 140. For ease of illustration, only one bonding nest will be described in detail; however, it should be understood that the assembly of the present invention has multiple bonding nests. Thereafter, an indexer 150 rotates a turntable 152 In the direction of the arrow 154. The turntable rotates from an assembled transfer position A to a segment inspection position B. Thereafter, the table is rotated to a position C where a core plate magazine 160 positions a core plate 170 into the bonding nest 140. Thereafter, the indexing table 152 is rotated to a an indexing bonding position D where an indexing bonder 180 bonds the cut segments of friction material to the core plate 170. Thereafter, the indexing table is rotated to an unloading position E where the core plate with the bonded friction material is unloaded. Finally, the table 152 is rotated to a position F for an empty nest check position. Thereafter, the table reverts to the position A to receive another supply of assembled cut segments.

Referring now to FIGS. 3–5 and in particular FIG. 3, a schematic illustration of a roll cutting device 21 is shown. The roll cutting device 21 cuts a strip of friction material 12 into individual segments 14.

According to one aspect of the present invention, the individual segments 14 of friction material are cut into trapezoidal or keystone shapes. As shown in the schematic illustration in FIG. 4, each individual segment 14 has en interior edge 15 and an exterior edge 17 and opposing angled sides 16 and 18.

In certain embodiments, the roll cutting device 21 can be a rotary die or roll cutting device, as schematically shown in FIG. 3. The roll cutting device 21 has a plurality of blades 22 positioned around an outer circumference of the roll cutting device 21. Each blade 22 has first and second ends 23 and 24, respectively, and a knife-edge 25. The blades 22 are positioned at oblique, or opposing, angles from each other such that, when the friction material 12 Is roll cut, the opposing (left and right) sides 16 and 18 of the individual friction segments 14 are at an angle with respect to each other, and are at an angle with respect to the interior and exterior edges 15 and 17, as will be described herein. It should be noted that the plurality of blades 22 are positioned around the circumference of the roll cutting device 21 such that the blades themselves define "keystone" shapes.

The roll cutting device 21 also includes opposing first and second outer diameter surfaces 27 and 29, respectively, which circumferentially extend around the first and second ends, 23 and 24, of each blade 22. It is to be understood that the desired width of the friction segment 14 is determined by the desired dimensions of the clutch plate, i.e., the outer and inner diameters of the equivalent full ring facing, the number of segments to be used per core, and the desired width of the space between the individual segments placed on the core.

The roll cutting device 21 is designed to cut segments 14 of friction material that meet certain predetermined desired geometric specifications for at least one particular type of friction plates. In the embodiment shown herein, the individual segments 14 are cut so that each segment has a trapezoidal shape. Preferably, the interior edge 15 and the exterior edge 17 of the cut segment 14 are parallel. The interior edge 15 has a length that is shorter than the length of the exterior edge 17. Thus the trapezoidal, or keystone, segment 14 has the first opposing side 16 that is at an acute angle with respect to a line defined by the exterior edge 17, and the second opposing side 18 that is at an opposite and equal angle with respect to the line defined by the exterior edge 17. Thus, the first opposing side 16 on a first segment 14a, when positioned on the clutch plate, is in parallel relationship to the second opposing side 18' on an adjacent, or keystone, segment 14c.

This "keystone segmenting" cutting of the friction material achieves 100% material utilization of the friction material. The individual keystone segments are assembled to produce a friction plate with full depth radial grooves. It is to be understood that various different groove geometry patterns are possible using this method and each pattern yields 100% material utilization and full depth grooves.

FIG. 5 is a side elevation schematic illustration of the roll cutting apparatus 20. The roll cutting apparatus 20 includes the roll cutting device 21 which is paired and mechanically synchronized using integral gears (not shown) with a drive roller 42. The drive roller 42 has a shaft 44 that is supported at both ends by bearings (not shown). The roll cutting device 21 is held in a vertical position by a jackscrew 50 and opposing cam rollers 52 and 54. The jackscrew 50 applies pressure to a plate, or mounting, surface 56 which is operatively connected to the cam rollers 52 and 54. The cam rollers 52 and 54 engage the first and second outer diameters 27 and 29 of the roll cutting device 21. It should be noted that the cam rollers 52 and 54 engage the first and second outer diameter surfaces 27 and 29 but permit the roll cutting device 21 to rotate freely.

Referring again to FIG. 3, it is to be understood that, in certain embodiments, the roll cutting device 21 has precise machined shoulders 31 and 33 that define the first and second outer diameters 27 and 29, respectively. The outer diameters of the shoulder regions 31 and 33 are slightly larger than the nominal outer diameter defined by the blades 22. The shoulder height of the shoulder regions 31 and 33 is related to the thickness of the friction material that is being segmented. The desired shoulder height allows the friction material to pass between the roll cutting device 21 and the drive roller 42 without getting crushed. After the material 12 is cut into segments 14, designated as 14*a–z*, the cut segments 14*a–z* are advanced or "pushed down" a covered track 58. The covered segment track 58 prevents the moving cut segments 14*a–z* from overlapping ("shingling") or stacking on each other. This "pushing effect" is possible since the friction material is typically rigid and typically has a thickness in the range of about 0.17 to about 0.35 inches (about 4.32 mm to about 8.89 mm).

Figure 7:
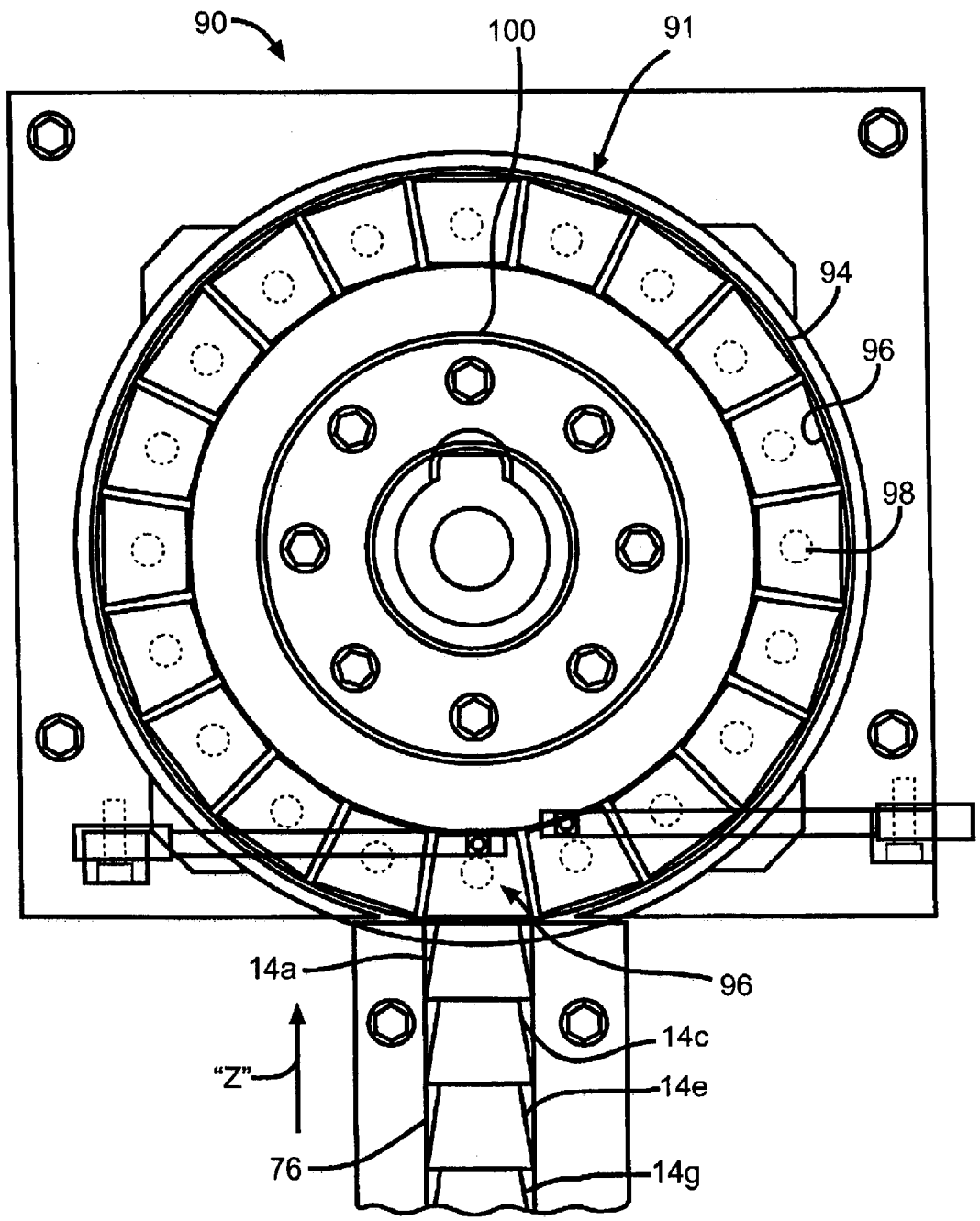
FIG. 7 is a top plan schematic illustration, partially in phantom, of an indexing fixture showing the direction of travel of segments of friction material.

Referring to FIG. 6, once the first, or lead, keystone segment 14*a* in the line of cut segments 14*a–z* reaches a transfer position 71, the shuttle assembly 70 moves, or transfers, the first cut segment 14*a* from the covered track 58 into a first empty pocket 96 of the adjacent indexing fixture 91 (as shown in FIG. 7).

Concurrently, as seen in FIG. 4, the remaining line of cut segments 14*b–z* advances the second segment 14*b* to the transfer position 71 in the shuttle assembly 70. The shuttle assembly 70 engages the second keystone segment 14*b* and moves in a reverse direction and transfers the second segment 14*b* into a first empty pocket 97 of the adjacent second indexing fixture 92. The second indexing fixture 92 is located opposite, or at a 180°, from the first indexing fixture 91.

Continuing with the assembly steps, the first indexing fixture 91 rotates to its next, or second, position, thereby exposing another, or second, empty pocket. For ease of illustration, each pocket will generally be referred to as 96 or 97, but it should be understood that the number of pockets in each indexing fixture is dependent upon the number of keystone friction segments that are desired on the friction plate. The shuttle assembly 70 again reverses direction, engages a third keystone segment 14*c*, now being moved into the transfer position 71, and transfers the third segment 14*c* into the second pocket 96 in the first indexing fixture 91. Concurrently, the second indexing fixture 92 rotates one position thereby exposing another, or second empty pocket for receiving the fourth cut segment 14*d*.

This sequence of alternating placement of keystone segments continues until all the pockets 96 and 97 in both the first 91 and second 92 indexing fixtures have been filled with keystone segments 14.

Figure 8:
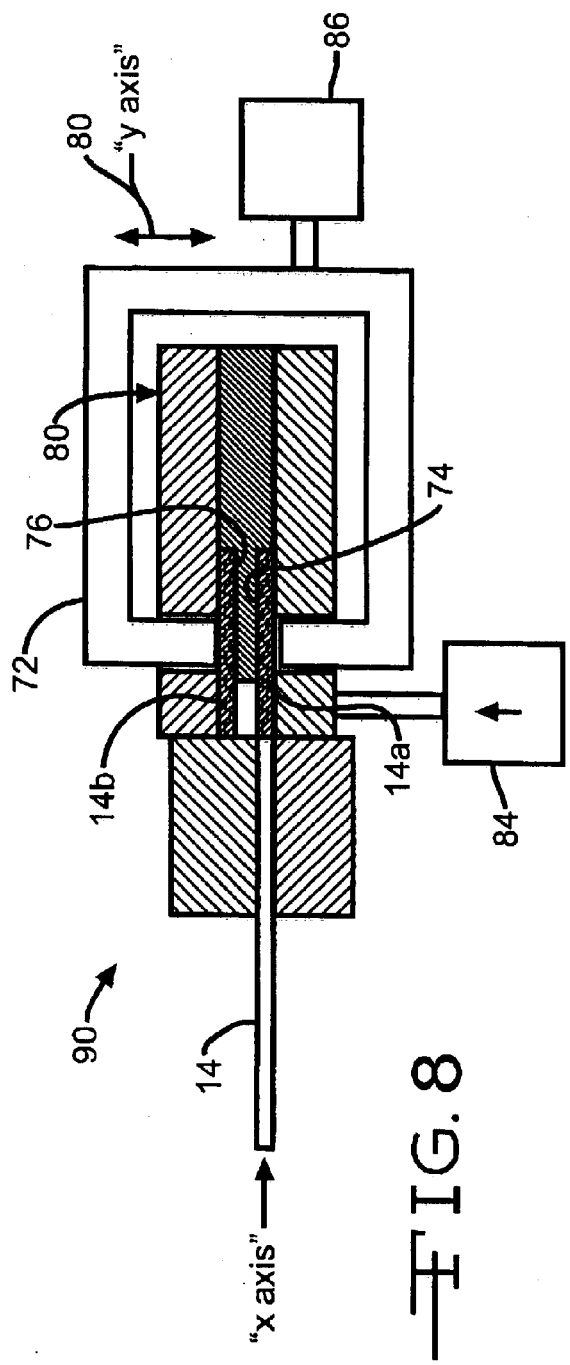
FIG. 8 is a side cross-sectional schematic illustration of a track assembly showing a vertical direction of travel of the track assembly and separation of cut segments of friction material.

Referring now in particular to FIGS. 6, 8 and 9, the assembly station 90 is shown in detail. For ease of illustration, the movement of the cut segments 14 will be described as moving in the three planar directions, namely, the x, y, and z axis directions. FIG. 6 is a top schematic illustration showing the segment direction of travel of the keystone segments 14 Indicated by arrow "x" into the shuttle assembly 70. The shuttle assembly 70 includes a horizontal shuttle device 72 and a vertical shuttle device 80. The horizontal shuttle device 72 is operatively connected to a first linear motor 86. The vertical shuttle device 80 includes a bottom track 74 and a top track 76. The vertical shuttle device 80 is operatively connected to a second linear motor 84.

It is to be understood that various useful linear motors can be used with the present invention and that commercially available linear motors generally comprise two mechanical elements: a stator and a linear slider. The stator typically houses windings (not shown) which create an electromagnetic field. This electromagnetic field is controlled, and by varying these controlling parameters, the electromagnetic field imparts motion to the slide. The linear motors are characteristically of low inertia and are therefore especially suitable in this application where rapid accurate linear control is desired.

FIG. 6 is a plan, or top, schematic view that shows the direction of travel of the cut segments in the "x" direction and the horizontal shuttle device 72 in the direction of arrow "z".

FIG. 8 is a cross sectional view showing the vertical direction of travel of the vertical shuttle device 80 in the direction of arrow "y" and the separation of segments 14 into either the bottom track 74 or the top track 76.

Figure 9A:
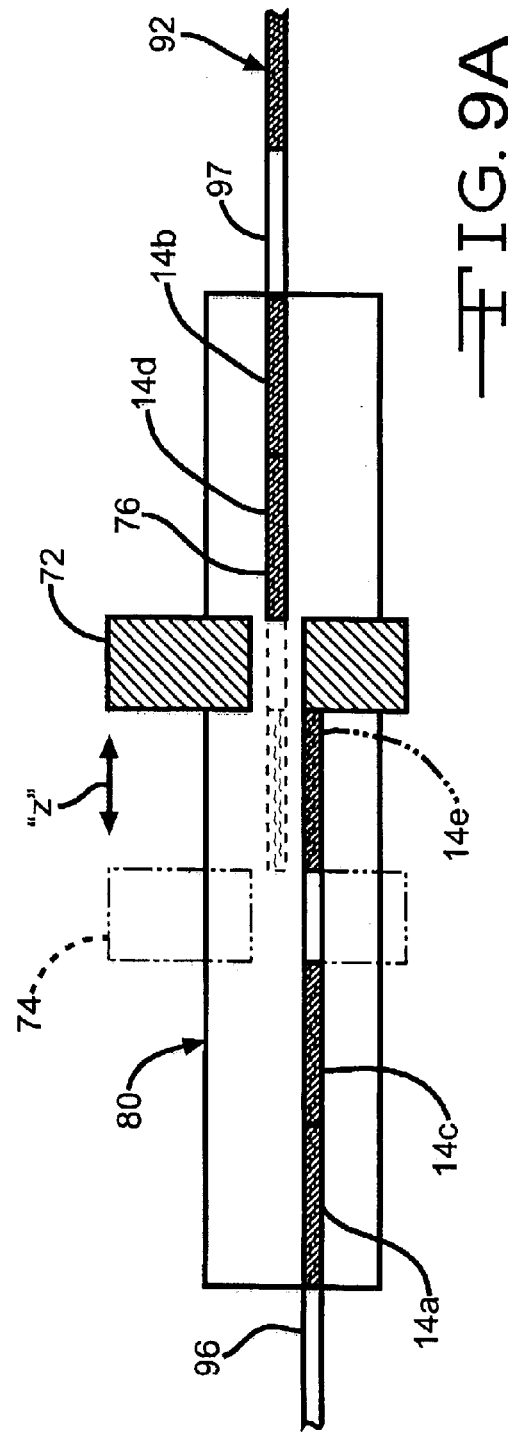
FIG. 9 is a front cross-sectional illustration of a track assembly showing a horizontal shuttling mechanism and cut segments of friction material.

FIGS. 9A and 9B show a cross sectional view showing the horizontal direction of travel of the horizontal shuttle device 72 along the "z" axis where the horizontal shuttle device 72 engages the inserted segment 14*e* in the bottom track 74. Also shown in FIG. 9A is the horizontal shuttle device 72 in phantom in the reverse direction. It should be understood, however, that when the horizontal shuttle device 72 is in the "phantom", or reversed, position (as shown in FIG. 9B), the vertical shuttle device 80 will be in the raised position such that the horizontal shuttle device 72 can then engage the next cut segment 14*f* that is being moved into the top track 76.

Referring again to FIGS. 6 and 8, the lead segment 14*a* travels along the "x" axis and reaches the transfer position 71 in the shuttle assembly 70. The segment 14*a* is positioned adjacent the horizontal shuttle device 72 which generally moves in a horizontal direction along the "z" axis, as shown by the arrow "z" in FIGS. 9A and 9B. Then the following movements occur:

The lead segment 14*a* advances into the bottom exposed and empty track 74 which is enclosed in the vertical shuttle device 80.

Once the first segment 14*a* is fully advanced and seated in the bottom track 74, the vertical shuttle device 80 is moved in a down direction, along the "y" axis by a vertical linear motor 84, to separate the first segment 14*a* from the remaining cut segments 14*b–z*. As the vertical shuttle device 80 Is moving in the up/down "z" direction, the segments 14*b–z* continue to advance along the "x" axis. In certain embodiments, this process occurs very rapidly and feed rate is approximately 5.5 inches per second.

As the vertical shuttle device 80 reaches the bottom of its stroke, the second segment 14*b* is now the lead segment and is advanced into the top track 76.

As the second segment 14*b* is moving into the top track 76, the previously located first segment 14*a* in the bottom track 74 is shuttled horizontally by the horizontal shuttle device 72. The horizontal shuttle device 72 is fixed in the vertical direction such that it oscillates horizontally and is actuated by a horizontal linear motor 86. The previously located first segment 14*a* on the bottom track 74 is shuttled horizontally, in the "z" direction, at an 90° angle from the "x" direction of travel of the cut segments 14*e–z*, as shown in FIG. 6.

As shown in FIG. 9, the lead segment 14*a* is advanced into the empty pocket 96 in the indexing fixture 91. Similarly, the segment 14*b* is advanced into the empty pocket 97 in the second indexing fixture 92. Thus, as can be seen by FIG. 9, the indexing figures 91 and 92 are positioned at 180° from each other yet are not coplanar with each other. The first indexing figure 91 is coplanar with the bottom track 74 while the second indexing figure is coplanar with the top track 76. The vertical shuttle device 80 reciprocates between the up and down positions, in the "y" direction, thus allowing alternating segments 14 to be transferred into the first indexing fixture 91, then the second indexing fixture 92, back again to the first indexing fixture 91, and so forth. It is to be understood that while the horizontal shuttle device 72 is moving along the "z" axis and the vertical shuttle 80 is moving along the "y" axis, the first and second indexing fixtures 91 and 92 are rotating in a circumferential manner to present empty pockets 96 and 97 for tangentially receiving the alternating and advancing segments 14.

The advancing cut segments 14 are controlled by "tracking" along the covered track 58. The covered track 58, the bottom track 74 and the top track 76 are designed so that segment movement is limited to the desired direction of travel at a specific point in the assembly sequence. Also, the widths of the bottom and top tracks 74 and 76 are slightly larger than longest, or exterior, edge 17 of the cut segment 14 to allow for clearance from the trailing adjacent segment.

In certain embodiments, the timeframe for this sequence of cut segment movement is very short. In certain embodiments, the apparatus shuttles at least about 400 cut segments per minute, or about 7 segments per second.

Referring now to FIG. 7, a plan view of the indexing fixture 91 is shown; The direction of travel is indicated by arrow Z of alternating segments 14a, 14c, 14e and 14g traveling along the bottom track 74.

The indexing fixture 91 comprises an indexing plate 94 having a plurality of integrally machined segment pockets 96. In the embodiment shown, there are 20 segment pockets in the indexing plate 94. However, it should be understood that the indexing plate 94 can have a different number of pockets, depending on the number of individual segments to be positioned on a core plate. It should be further understood that the second indexing figure 92 can be substantially identical to the first indexing figure 91. For ease of illustration and description, only the discussion of the first indexing figure 91 will be described in detail herein. It should be further understood however, that such description also adequately describes the second indexing figure 92.

The pockets 96 are slightly recessed in the indexing plate 94 to allow for accurate, vertical, radial and circumferential location of each cut segment 14. In certain embodiments, the depth of the pockets 96 ranges from about 0.020 to about 0.030 inches. Further, the keystone, or trapezoidal, shape of the segments facilitates accurate positioning of each segment 14 in the corresponding pocket 96.

Each pocket 96 defines a separate vacuum port 98. Typically, the cut segments have an adhesive or glued backing such that the porosity of the cut segment is relatively low. Therefore, the vacuum port 98 is used to apply a vacuum to further maintain the positioning of the segment 14 in the pocket 96 (if required). In the embodiment shown, the indexing plate 94 is operatively connected to a rotating mechanism generally indicated as 100 which rotates, or indexes, the indexing plate 94. In the case of a 20-cut segment core plate, for instance, the indexing figure 91 is moved or indexed 18° between the placement of segments. Since indexing accuracy is important, the rotating apparatus 100 generally comprises a servo motor and gear head assembly (not shown) which is operatively mounted to the indexing fixture 91.

Once the pockets 96 have been filled with segments 14a–t, the segments are transferred to a bonding nest 140 in a suitable manner, as will be described in detail below.

Figure 10:
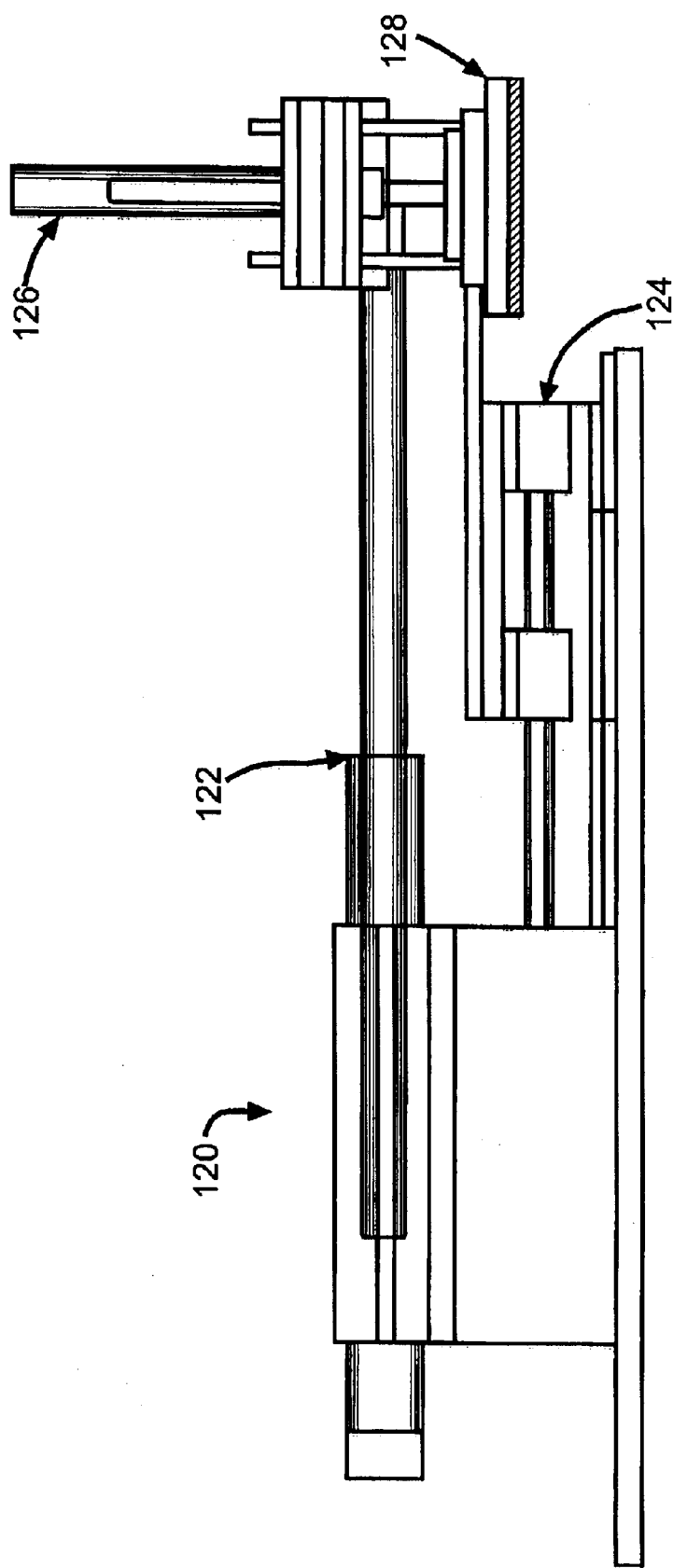
FIG. 10 is a side elevational view, partially in phantom, of a linear slide transfer assembly.
Figure 11:
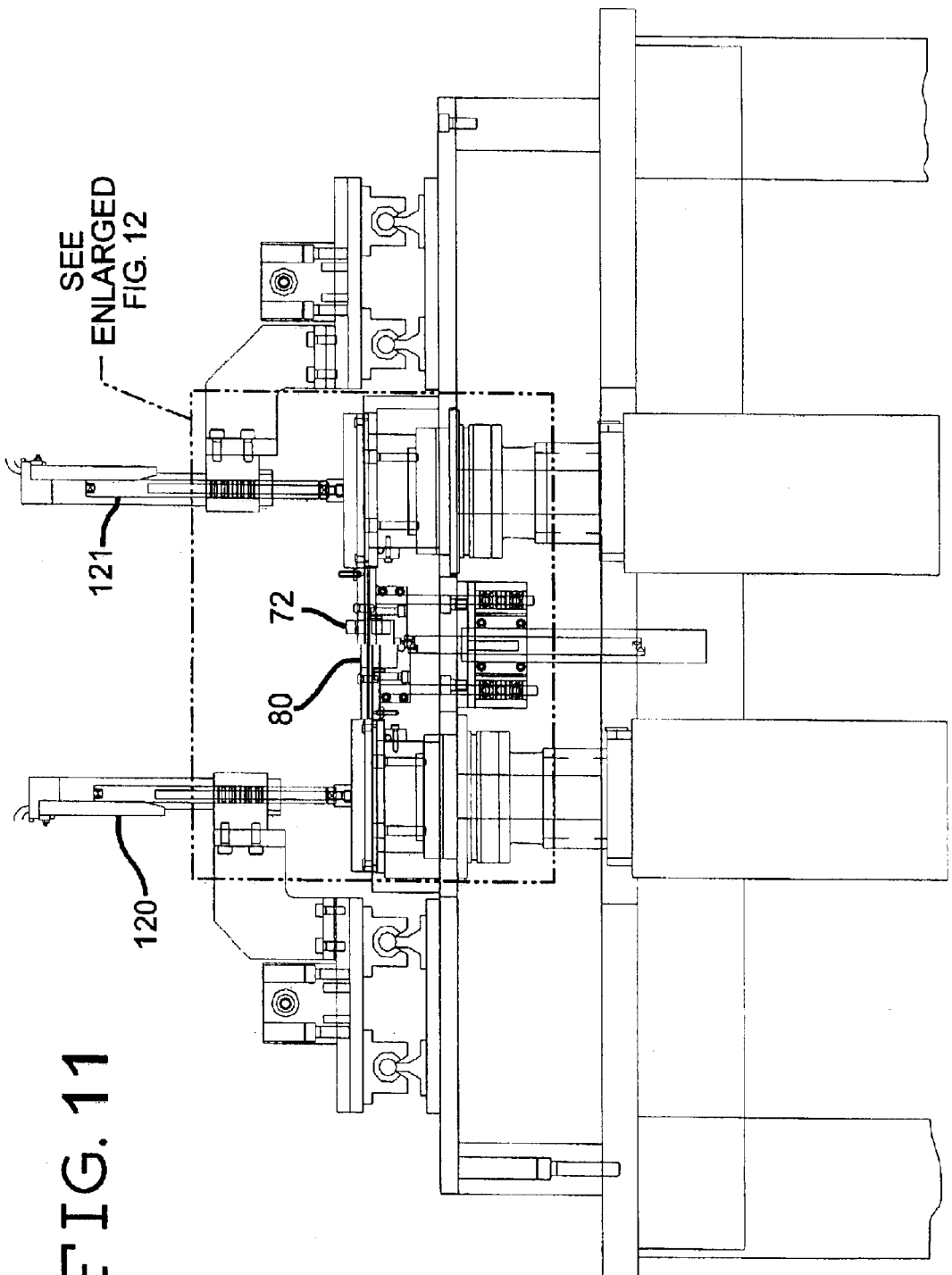
FIG. 11 is an end view schematic illustration, partially in phantom, of a core plate pick and place assembly.
Figure 12:
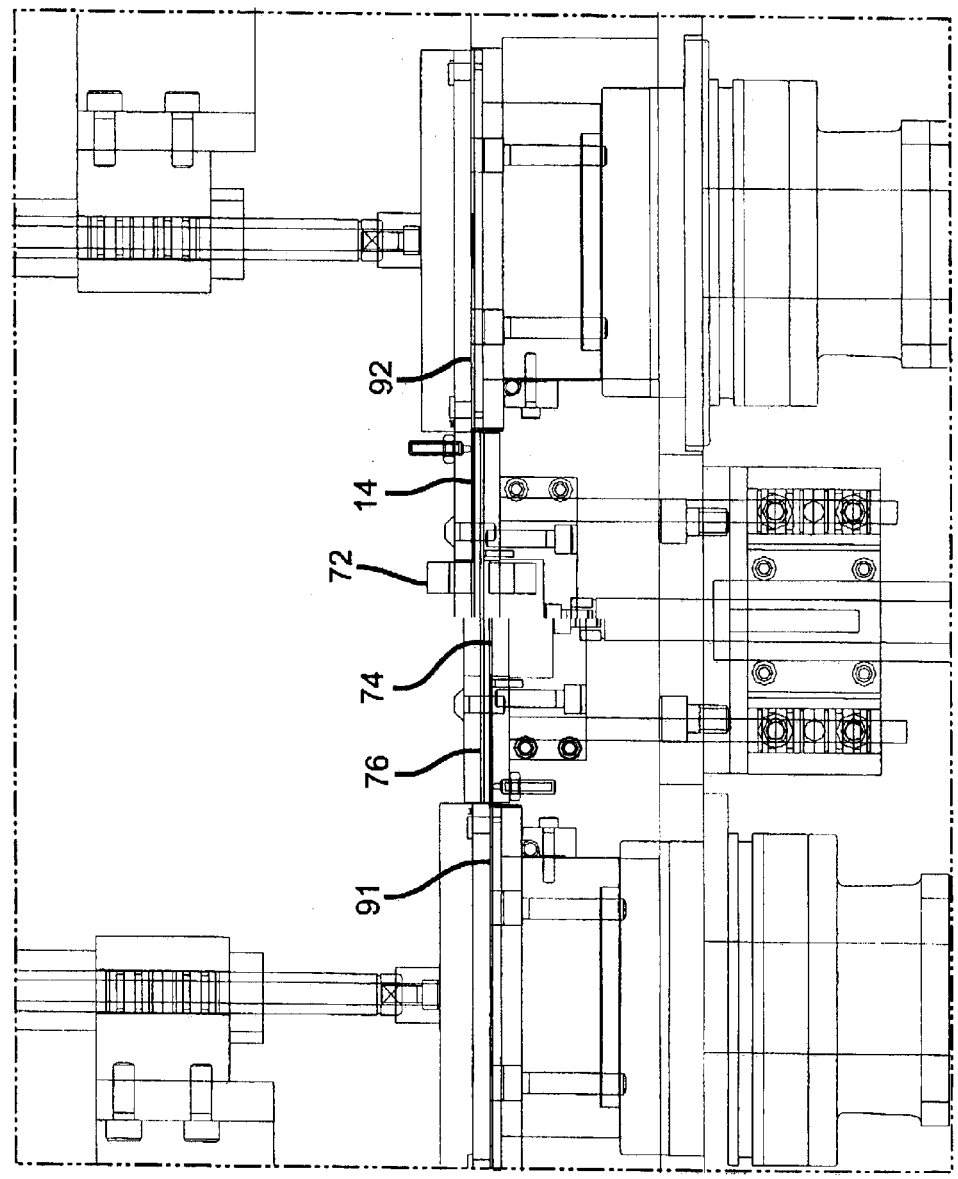
FIG. 12 is an enlarged view of a section shown in FIG. 11.

FIG. 10 is a schematic side elevation view of the first transfer assembly 120 which includes a linear slide 122, a linear bearing 124, a linear motor assembly 126 and a vacuum head 128. FIGS. 11 and 12 are schematic illustrations, partially in phantom, showing the relative position of the vertical shuttle device 80 with respect to the horizontal shuttle device 72. It should be understood that, in operation, two transfer assemblies 120 and 121, as shown in FIG. 2, are used. It should be further understood that the second transfer assembly 121 can be substantially identical to the first transfer assembly 120. For ease of illustration and description, only the discussion of the first transfer assembly 120 will be described in detail herein. It should further be understood, however, that such description also adequately describes the second transfer assembly 121. The linear slide 122 provides a high speed and reliable mechanical method of traversing between two fixed points: the indexing fixture 91 and the adjacent and empty bonding nest 140. The vacuum head 128 is operatively connected to the vertical linear motor 126 which, in turn, is operatively connected to the linear slide assembly 122. The vertical linear motor 126 permits movement of the vacuum head 128 to and from a "pick" position adjacent the indexing fixture 91. The segments 14 are picked up by the vacuum head 128 and transferred to the bonding nest 140 by movement of the linear motor 126 along the linear slide 122. Thereafter, the vacuum pressure being provided by the vacuum head 128 on the segments 141s terminated allowing the segments 14a–t to be positioned in the bonding nest 140. The linear motor assembly 126 and the vacuum head 128 are returned to a first position adjacent the indexing fixture 91, while the segments 14a–t remain in the bonding nest 140.

As described above with respect to FIG. 2, the core plate 130 is positioned on the segments 14 in the bonding nest 140. The segments 14 are located in the bonding nest 140 with the interior edge 15 toward an inner diameter of the bonding nests 140. This allows for parallel alignment of the opposing sides 16 and 18 of the keystone segments 14, which in turn produces parallel radially extending grooves 132 on the core plate 130, as schematically seen in FIG. 4.

In embodiments where only one side of the core plate 130 is to receive segments 14 of friction material, once the core plate 130 has been positioned on the segments 14 in the bonding nest 140, the segments 14 are then bonded to the core plate 130.

The segments 14 of friction material are adhered or bonded to the core plate 130 in a desired manner. One method for adhering the segments to the core plate involves using a thermosetting adhesive coated on the core plate. Thereafter, the friction material and core plate are heated in a suitable manner. The core plates can be stacked into a multiple nesting arrangement and heated in an oven. In another method, the assembled core plate, with the friction materials adjacent thereto, can be heated by conduction. Yet another method involves heating the core plate and friction materials adjacent thereto for with an induction coil.

Table 1 below shows the friction material utilization for various conventional art friction facing materials as compared to the keystone multi segment material of the present invention. As can readily be seen, the present invention provides for more efficient utilization of the friction material than the conventional materials.

TABLE 1

Material Utilization Comparison
Friction Plate with OD = 146 mm, ID = 121 mm

| | |
|---|---|
| Conventional 2-out Blanking = | 25% |
| Conventional 3-Segment Facing = | 54% |
| Conventional 20 Segment Facing = | 80% |
| Keystone Shaped Multi Segment = | 100% |

It is to be noted that conventional full ring blanking of friction material typically yields 25% material utilization (25% of the manufactured friction material ends upon the clutch plate and 75% ends up in landfills). The three segment facing uses about 54% of the friction material. The conventional 20 segment facing, such as those described in the background section herein, typically yields about 80% material utilization.

In comparison, the keystone shaped multi segment of the present invention has a material utilization of about 100%.

It should be understood that the above described apparatus is an example of one particular type of apparatus that can be utilized to with the present invention. The above descriptions of the preferred and alternative embodiments of the present invention are intended to be illustrative and are not intended to be limiting upon the scope and content of the following claims.

We claim:

1. A method for making a friction clutch plate having an annular core plate, comprising:
   a) cutting a supply of friction material into a plurality of individual cut segments having a predetermined shape;
   b) moving the cut segments in a first horizontal linear direction to a position adjacent a shuttle assembly; and,
   c) engaging at least a first cut segment with the shuttle assembly and transferring the first segment in a second horizontal linear direction which is substantially perpendicular to the first horizontal linear direction;
   d) depositing the first cut segment in a first indexing fixture;
   e) sequentially moving the remaining cut segments in the first horizontal linear direction to the position adjacent the shuttle assembly;
   f) engaging at least a second cut segment with the shuttle assembly and transferring the second cut segment in a third horizontal linear direction which substantially perpendicular to the first horizontal linear direction, the third horizontal linear direction being substantially in a 180° opposing direction from the second horizontal linear direction;
   g) depositing the second cut segment in a second indexing fixture;
   h) repeating steps a–g until each of the first and second indexing fixtures contain a predetermined number of individual cut segments; and
   i) depositing the plurality of cut segments from the first and second indexing fixtures onto first and second annular core plates, respectively, to form first and second function clutch plates.

2. The method of claim 1, further including the step of moving the cut segment in a vertical direction prior to moving the cut segment either in the second horizontal linear direction or the third horizontal linear direction.

3. The method of claim 1, in which the individual segments of friction material are cut into trapezoidal shapes.

4. An apparatus for making a friction material comprising at least one of:
   a cutting device for producing a plurality of predetermined cut shaped segments of friction material;
   a shuttle assembly comprising a reversible member for transferring a first set of the plurality of the cut segments of friction material into a first indexing fixture and for transferring a second set of the plurality of the cut segments of friction material into a second indexing fixture; and,
   at transfer assembly for placing the first and second sets of the plurality of cut segments onto first and second annular core plates, respectively.

5. The apparatus of claim 4, wherein the shuttle assembly supplies an additional set of cut segments of friction material onto a second surface of the core plate.

6. The apparatus of claim 4, wherein the shuttle assembly comprises a horizontal shuttle device for moving alternating cut segments of friction material in opposing directions, and a vertical shuttle device for separating individual cut segments to separate a first cut segment from the remaining cut segments.

7. The apparatus of claim 6, wherein the vertical shuttle device includes a first track for receiving a first cut segment and a second track for receiving a second cut segment, and wherein the horizontal shuttle device alternately moves between the first track and the second track.

8. The apparatus of claim 4, wherein the cutting device comprises a roll cutting apparatus having a plurality of obliquely positioned blades.

9. The apparatus of claim 8, wherein the roll cutting device defines opposing first and second outer diameter surfaces which extend beyond first and second ends of each blade, wherein the first and second outer diameter surfaces allow a desired thickness of friction material to pass between the roll cutting device and an opposing drive roller which operatively rolls or moves the roll cutting device.

* * * * *